United States Patent
Campuzano et al.

(10) Patent No.: US 10,577,815 B1
(45) Date of Patent: Mar. 3, 2020

(54) ADJUSTABLE BEAM SLEEVE DEVICE

(71) Applicants: Kayla Campuzano, Pahrump, NV (US); Michael Campuzano, Pahrump, NV (US)

(72) Inventors: Kayla Campuzano, Pahrump, NV (US); Michael Campuzano, Pahrump, NV (US)

( * ) Notice: Subject to any disclaimer, the term of this patent is extended or adjusted under 35 U.S.C. 154(b) by 0 days.

(21) Appl. No.: 15/785,558

(22) Filed: Oct. 17, 2017

(51) Int. Cl.
*E04G 15/06* (2006.01)
*F16L 55/00* (2006.01)

(52) U.S. Cl.
CPC ............ *E04G 15/063* (2013.01); *F16L 55/00* (2013.01)

(58) Field of Classification Search
CPC .......... E04G 15/063; F16L 55/00; B28B 7/30; B28B 7/28; B28B 7/285; B28B 7/32
USPC ...................... 249/142–153, 175–186, 63–64
See application file for complete search history.

(56) References Cited

U.S. PATENT DOCUMENTS

| | | | | |
|---|---|---|---|---|
| 1,960,502 A | * | 5/1934 | McMillan | ........... E04G 17/0742 249/215 |
| 3,340,342 A | * | 9/1967 | Kane | ..................... B29C 33/126 264/275 |
| 4,159,099 A | * | 6/1979 | Maguire | ................ E04G 15/061 249/177 |
| 5,156,755 A | | 10/1992 | Cass | |
| 5,405,119 A | | 4/1995 | Maguire | |
| 7,877,941 B2 | | 2/2011 | Fischer | |
| 8,689,503 B2 | | 4/2014 | Fischer | |
| 8,707,641 B2 | | 4/2014 | Rummelhoff | |
| 9,388,570 B2 | | 7/2016 | Brown et al. | |
| 2004/0016190 A1 | | 1/2004 | Radke | |
| 2004/0104498 A1 | | 6/2004 | Schneider | |
| 2006/0265980 A1 | * | 11/2006 | Vaughan | ................ E04G 15/061 52/220.8 |

OTHER PUBLICATIONS

Campuzano Sleeves. Facebook Business Webpage. Posts from Sep. 23, 2016 & Sep. 7, 2016. <https://www.facebook.com/campuzanosleeves/> (Year: 2016).*

* cited by examiner

*Primary Examiner* — Leith S Shafi
(74) *Attorney, Agent, or Firm* — Sanchelima & Associates, P.A.; Jesus Sanchelima; Christian Sanchelima

(57) ABSTRACT

An adjustable beam sleeve device with two telescopically mounted first and second sleeve assemblies with movable bowl assemblies at the distal ends. The first sleeve and the second sleeve are selectively set in relative position by means of a screw to form a telescopic column. The bowl assemblies are urged towards each other by an elastic string that is kept taut to produce snug fit when the adjustable beam sleeve is used between forms used to contain the concrete when poured. After the concrete is poured, the string is cut or the knots at the ends are removed along with the bowl assemblies resulting in a passage through the poured concrete after it is cured.

3 Claims, 5 Drawing Sheets

ADJUSTABLE BEAM SLEEVE DEVICE

FIELD OF THE INVENTION

The present invention relates to an adjustable beam sleeve and, more particularly, to an adjustable beam sleeve to produce a snug fit between beams.

DESCRIPTION OF THE RELATED ART

It is known that housing structures are constructed with concrete floors and slabs for structural stability and load-bearing capacity. Typically, concrete floors, beams, columns, slabs and other concrete structures are provided with voids, cavities, and openings formed to enable the installation and supply of utility conduits, including plumbing, electrical wiring, gas pipes, electronic cables, heating and cooling ductworks and other required amenities. It is important to align the ends of the sleeve devices to the forms prior to pouring the concrete. The configuration and positioning of the forms is not always the same or kept in a parallel and spaced apart relationship always. With improvements in technology, adjustable sleeves are used to form superposed voids, cavities, and openings. However, the present invention not only readily adjusts itself to the required longitudinal dimensions but also in conforms its ends to the orientation of the forms used to hold the concrete when poured resulting in a uniform through passage.

Several designs for an adjustable beam sleeve have been designed in the past. For example, U.S. Pat. No. 9,388,570 discloses an extendable sleeve for poured concrete with releasable end caps that can be removed after concrete sets and are held in place by filament.

In another example, U.S. Pat. No. 8,707,641 discloses a telescoping canning sleeve for forming voids in concrete slabs.

In another example, U.S. Pat. No. 5,156,755 discloses an adjustable apparatus for forming voids in concrete that consists of a telescoping tube with bowl shaped end cap held in place by a threaded rod.

In another example, U.S. Pat. No. 7,877,941 discloses a lead-through for a conduit with two diaphragm-shaped end caps.

In another example, U.S. Pat. No. 8,689,503 discloses an embedded device for passing conduits through a constructional component that consists of an extendable threaded cylinder with flush-mount stabilizing ends.

In another example, United States Patent Application 2004/0016190 discloses a modular device to create a passage through a partition including poured concrete.

In another example, United States Patent Application 2004/0104498 discloses a tubular sleeve insert for creating a void in precast concrete with end caps that snap on.

In another example, Foreign Patent Document CA2637848A1 discloses a telescopic sleeve device for forming a pass-through in a concrete floor.

However, none of the above references disclose an adjustable beam sleeve that includes the features of the present invention. The devices available in the prior art are provided in different lengths to accommodate variable thickness of the concrete structures. The sleeve devices, if longer, than needed, are cut shorter thereby wasting material and increasing labor costs. If the devices are shorter, then an extension needs to be added to increase the length, which might not provide enough strength required to do the intended function. Overall cost of the material and labor may increase due to the above reasons. Additionally, if the forms (used to hold the concrete to be poured) are not parallel to each other, the sleeve devices of the prior art will only extend to meet the closest point of the form. This leaves open areas between the end of the sleeve device and the forms allowing concrete to come inside the sleeve device clogging it.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide an adjustable beam sleeve that can be used in concrete structures using forms.

It is another object of this invention to provide an adjustable beam sleeve device with telescopic sleeve assemblies with bowl assemblies at their distal ends that rotates to conform to the angular position of the forms to which the bowl assemblies come in abutting contact.

It is still another object of the present invention to provide an adjustable beam sleeve to produce pre-finished openings such that pipes can be run through to accommodate crooked beams.

It is yet another object of this invention to provide an adjustable beam sleeve that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
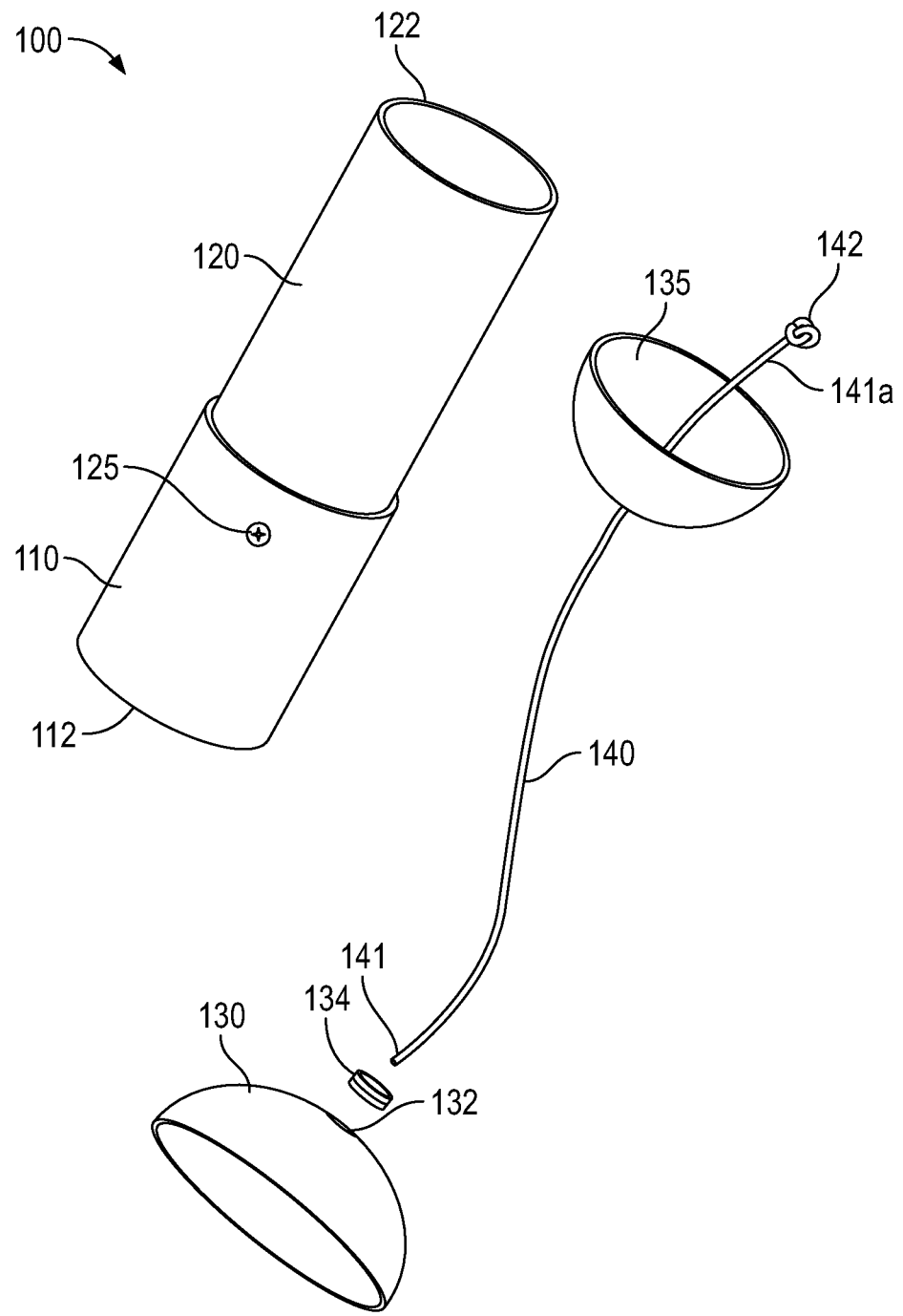
FIG. 1 illustrates an exploded view of an adjustable beam sleeve, in accordance with one embodiment of the present disclosure.

The following detailed description is intended to provide example implementations to one of ordinary skill in the art, and is not intended to limit the invention to the explicit disclosure, as one or ordinary skill in the art will understand that variations can be substituted that are within the scope of the invention as described.

The present disclosure discloses an adjustable beam sleeve device 100 that can be used in concrete industry structures where concrete is poured in a space that includes holding forms. The adjustable beam sleeve device 100 comprises a first sleeve assembly 110 and a second sleeve assembly 120. First sleeve assembly 110 and second sleeve assembly 120 are telescopically coupled to each other and selectively kept in a relative position with respect to each other by means of screw 125 to form a telescopic column of the desired effective length. First bowl assembly 130, having concave and convex sides, is abuttingly mounted to the distal end of assembly 110. Second bowl assembly 135, also having concave and convex sides, is abuttingly mounted to the distal end of second sleeve assembly 120. Adjustable beam sleeve device 100 comprises an elastic string 140 drawn through a first though hole 132 in first bowl assembly 130, first sleeve 110, second sleeve 120, second bowl assembly 135 and a second through hole (not shown) to produce a snug fit when the adjustable beam sleeve device 100 is used between beams.

In one example, an adjustable beam sleeve device 100 comprises a string 140 with ends 141; 141a, each having a knot 142 to the ends from going through first hole 132 and second hole (not shown) when kept string 140 is kept taut. First grommet 134 and second grommet (not shown) are provided to avoid the edges of holes bowl assemblies 130 and 135 from cutting into string 140.

Various features and embodiments of the adjustable beam sleeve are explained in conjunction with the description of FIGS. 1-5.

Referring now to FIG. 1, an exploded view of an adjustable beam sleeve 100 is shown, in accordance with one embodiment of the present disclosure. The adjustable beam sleeve 100 comprises a first sleeve 110. The first sleeve 110 comprises a first sleeve distal end 112. Further, the adjustable beam sleeve 100 comprises a second sleeve 120. The second sleeve 120 comprises a second sleeve distal end 122. In one example, each of the first sleeve 110 and the second sleeve 120 may be made up of 2O gauge sheet metal, or gauge. In another example, the first sleeve 110 and the second sleeve 120 may be made up of any other suitable material that can undergo pressure when used with concrete and other similar material. It should be understood that inner diameter of the first sleeve 110 is more than the outer diameter of the second sleeve 120. In one embodiment, the first sleeve 110 and the second sleeve 120 are coupled by means of a screw 125. It should be understood that the second sleeve 120 is made to go inside the first sleeve 110 and the screw 125 is used to lock them such that overall length of the second sleeve 120 can be adjusted.

Further, the adjustable beam sleeve 100 comprises a first bowl 130 provided at the first sleeve distal end 112. The first bowl 130 comprises a first hole 132 at one end as shown in FIG. 1. Further, the first bowl 130 comprises a first grommet 134 provided at the first hole 132. Furthermore, the adjustable beam sleeve 100 comprises a second bowl 135 provided at second sleeve distal end 122. The second bowl 135 comprises a second hole (not shown) at one end. Further, the second bowl 135 comprises a second grommet (not shown) provided at the second hole. The first bowl 130 and the second bowl 135 may be made up of galvanized steel or any other suitable material.

In one implementation, the adjustable beam sleeve 100 comprises an elastic string 140. The elastic string 140 comprises a first end 141 and a second end 141a. In the current implementation, the elastic string 140 is drawn through the first hole 132 and the second hole. Specifically, the first end 141 of the elastic string 140 is held and the elastic string 140 is drawn through the first hole 132 of the first bowl 130 via the first grommet 134. Further, the elastic string 140 is drawn through the inner portion of the first sleeve 110 and the second sleeve 120. Furthermore, the elastic string 140 is drawn through the second hole of the second bowl 135 via the second grommet such that the second end 141a of the elastic string 140 comes out of the second bowl 135. After drawing the elastic string 18 through the first hole 132, inner portion of the first sleeve 110 and the second sleeve 120, and the second hole, a knot 142 is made at the first end 141 and the second 141a. The knot 142 is made to ensure that the elastic string 140 is held rigidly between the first bowl 130 and the second bowl 135. Subsequently, the elastic string 140 is pulled tight such that one end of the first bowl 130 is firmly coupled to the first sleeve distal end 112 and one end of the second bowl 135 is firmly coupled to the second sleeve distal end 122. In the current implementation, the first grommet 134 and the second grommet (not shown) are provided at the first hole 132 of the first bowl 130 and the second hole of the second bowl 135, respectively in order to prevent the elastic string 140 from cutting when drawn through the first hole 132 and the second hole.

Figure 2:
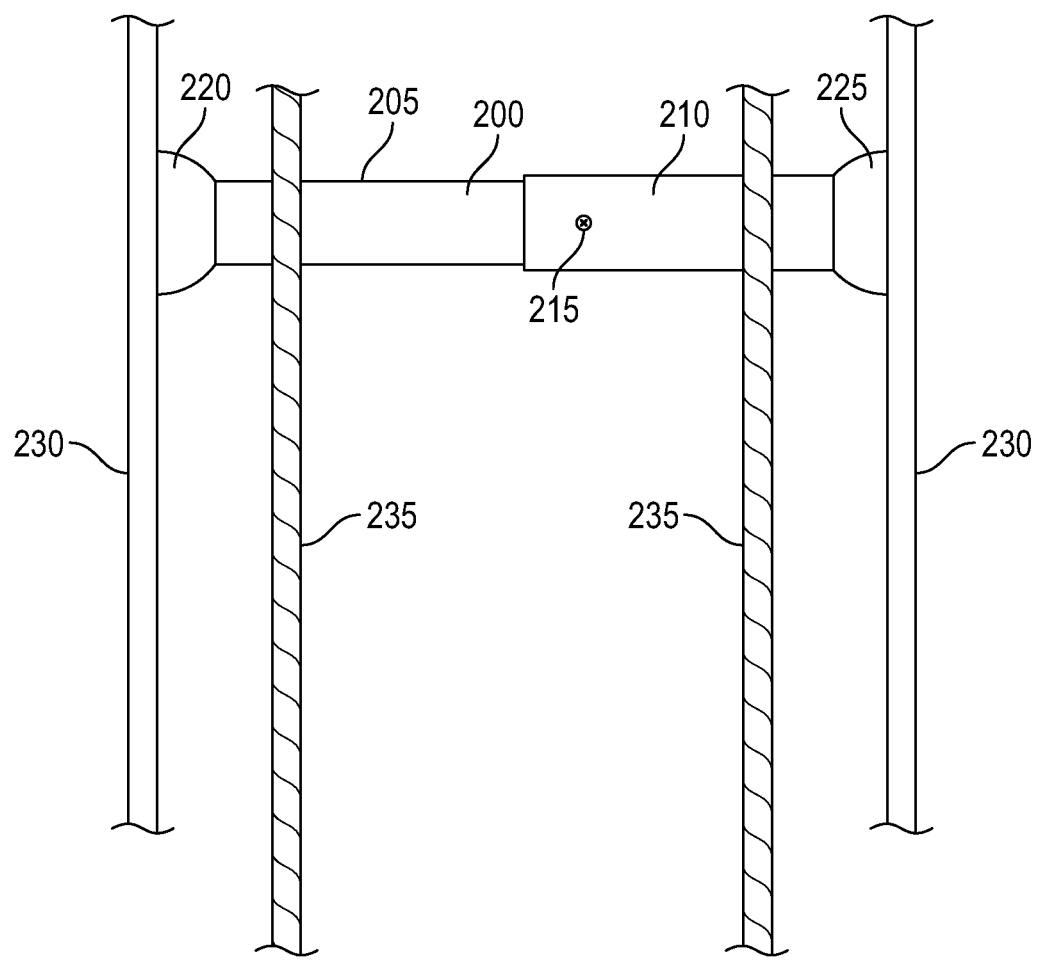
FIG. 2 shows an adjustable beam sleeve, in accordance with one exemplary embodiment of the present disclosure.

Now, referring to FIG. 2, an adjustable beam sleeve 200 coupled to beams 230 is shown, in accordance with one exemplary embodiment of the present disclosure. As can be seen, the adjustable beam sleeve 200 comprises a first sleeve 205 and a second sleeve 210. In the current embodiment, inner diameter of the second sleeve 210 is more than the outer diameter of the first sleeve 205. The first sleeve 205 and the second sleeve 210 are coupled by means of a screw 215. Further, the adjustable beam sleeve 200 comprises a first bowl 220 provided at one end (similar to first sleeve distal end 112) of the first sleeve 205. Further, the adjustable beam sleeve 200 comprises a second bowl 225 provided at one end (similar to second sleeve distal end 122) of the second sleeve 210. Furthermore, the adjustable beam sleeve 200 comprises an elastic string (not shown, similar to elastic string 140) drawn through the first bowl 220, inner portion of the first sleeve 205 and the second sleeve 210, and through the second bowl 225.

In the current example, the adjustable beam sleeve 200 may be coupled to the beams 230. Specifically, the adjustable beam sleeve 200 may be coupled to the beams 230 by means of the first bowl 220 and the second bowl 225. Further, the adjustable beam sleeve 200 may comprise steel bars 235 provided to support the adjustable beam sleeve 200. In operation, the elastic string is pulled through the first bowl 220, inner portions of the first sleeve 205 and the second sleeve 210, and the second bowl 225 to produce a snug fit between the beams 230. In one example, the adjustable beam sleeve 200 may be used to produce pre-finished openings with the help of the first bowl 220 and the second bowl 225. Specifically, the first bowl 220 and the second bowl 225 may be coupled to the beams 230. Subsequently, concrete may be poured and then the concrete is made to dry. After the concrete is cured, the first bowl 220 and the second bowl 225 may be removed by loosening the elastic string. When the first bowl 220 and the second bowl 225 are removed, each of the first bowl 220 and the second bowl 225 leaves an opening in the beams 230 due to shape of the first bowl 220 and the second bowl 225. The openings may be used to draw pipes.

Figure 3:
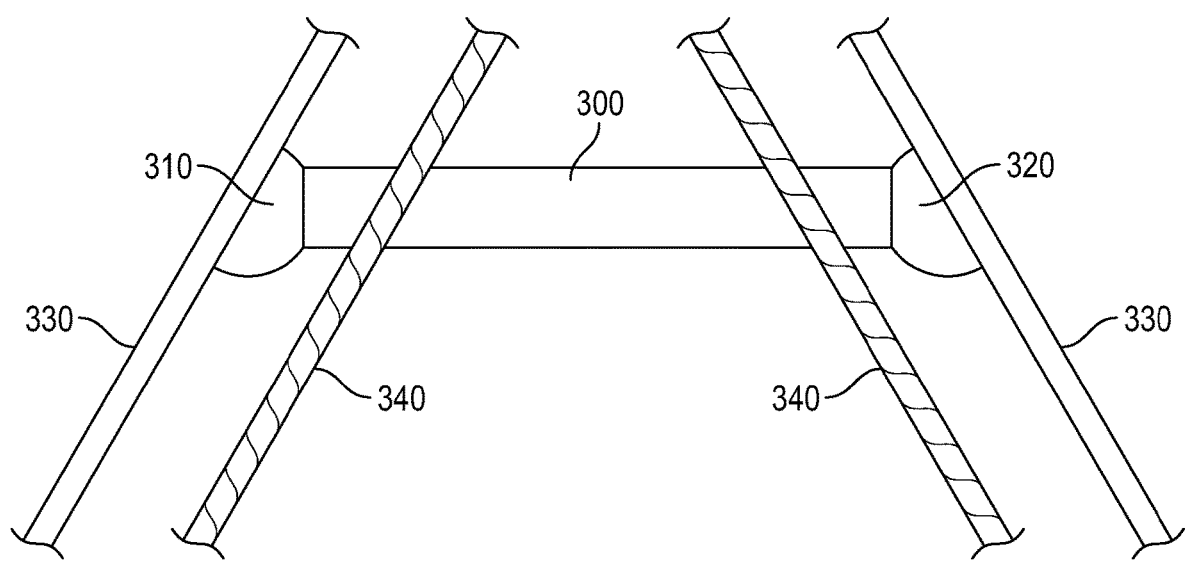
FIG. 3 shows an adjustable beam sleeve, in accordance with another exemplary embodiment of the present disclosure.

Now, referring to FIG. 3, an adjustable beam sleeve 300 coupled to beams 330 is shown, in accordance with another exemplary embodiment of the present disclosure. As can be seen, the adjustable beam sleeve 300 is a cylindrical or telescopic column that is provided between the beams 330. The adjustable beam sleeve 300 comprises a first bowl 310 provided at one end and a second bowl 320 provided at another end. Further, the adjustable beam sleeve 300 comprises an elastic string (not shown, similar to elastic string 140) drawn through the first bowl 310, inner portion of the adjustable beam sleeve 300, and through the second bowl 320.

In the current example, the adjustable beam sleeve 300 having same size throughout (i.e., cylindrical column) may be coupled to the beams 330. Specifically, the adjustable beam sleeve 300 may be coupled to the beams 330 by means of the first bowl 310 and the second bowl 320. Further, the adjustable beam sleeve 300 may comprise steel bars 340 provided to support the adjustable beam sleeve 300. In operation, the elastic string is pulled such that the elastic string, the first bowl 310 and the second bowl 320 produce a snug fit between the beams 330. As explained above, the adjustable beam sleeve 300 may be used to produce prefinished openings with the help of the first bowl 310 and the second bowl 320.

It should be understood that more than one adjustable beam sleeve might be used to produce openings in the beam. Further, it should be understood two adjustable beam sleeves having first sleeve and second sleeve with different sizes, or having two cylindrical columns of same size or in combination may be used to produce openings in the beam and such implementations should be obvious to a person skilled in the art.

Figure 4:
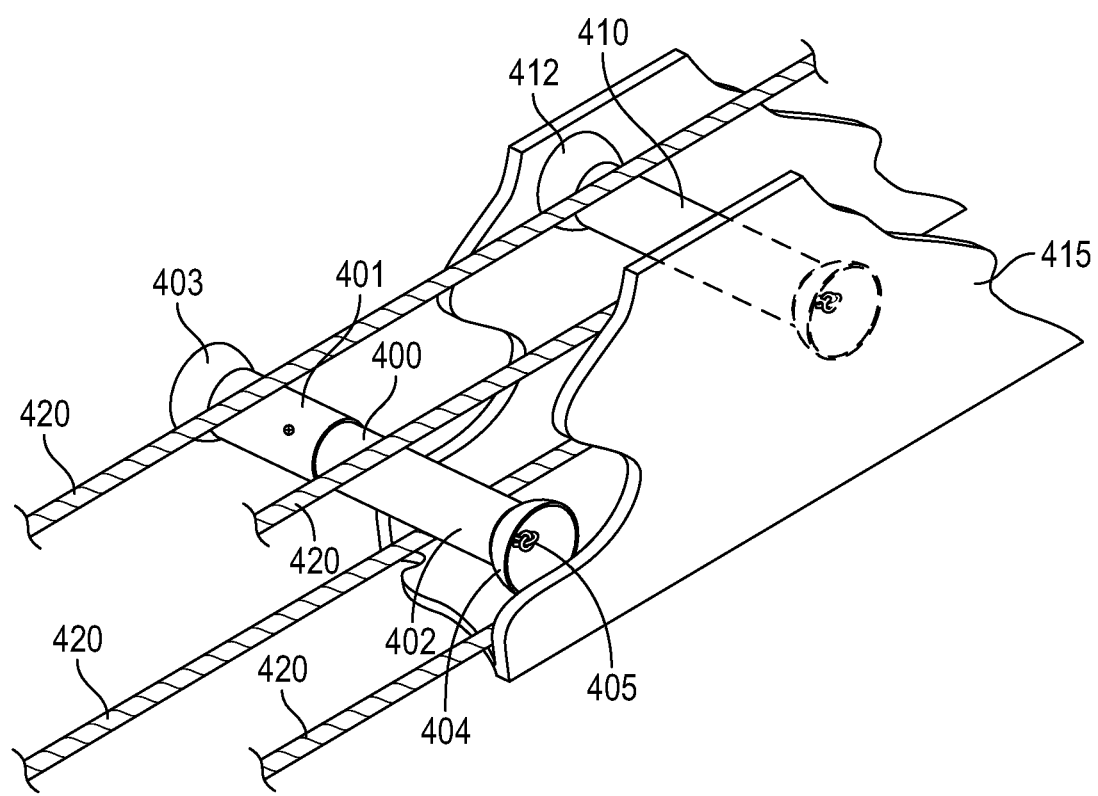
FIG. 4 shows an adjustable beam sleeve, in accordance with one exemplary embodiment of the present disclosure.

Now, referring to FIG. 4, a first adjustable beam sleeve 400 having an first sleeve 401 and a second sleeve 402 and a second adjustable beam sleeve 410 being a cylindrical column are shown, in accordance with one exemplary embodiment of the present disclosure. As can be seen, the first adjustable beam sleeve 400 comprises the first sleeve 401 and the second sleeve 402. In the current embodiment, the inner diameter of the first sleeve 401 is more than the outer diameter of the second sleeve 402. Further, the first sleeve 401 comprises a first bowl 403 at one end (similar to first sleeve distal end 112). The second sleeve 402 comprises a second bowl 404 at one end (similar to second sleeve distal end 122). As explained above, the first adjustable beam sleeve 400 comprises an elastic string 405 drawn through the first bowl 403, inner surfaces of the first sleeve 401 and the second sleeve 402, and the second bowl 404.

Further, the second adjustable beam sleeve 410 comprises a third bowl 412 at one end and a fourth bowl (not shown) at another end. As presented above, each of the first adjustable beam sleeve 400 and the second adjustable beam sleeve 410 may be coupled to a bracket structure or beam 415. Specifically, the first adjustable beam sleeve 400 is coupled to the bracket structure 415 by means of the first bowl 403 and the second bowl 404, and the second adjustable beam sleeve 410 is coupled to the bracket structure 415 by means of the third bowl 412 at one end and the fourth bowl at another end. Further, the first adjustable beam sleeve 400 and the second adjustable beam sleeve 410 may be supported with help of a plurality of steel bars 420 as shown on FIG. 4.

Figure 5:
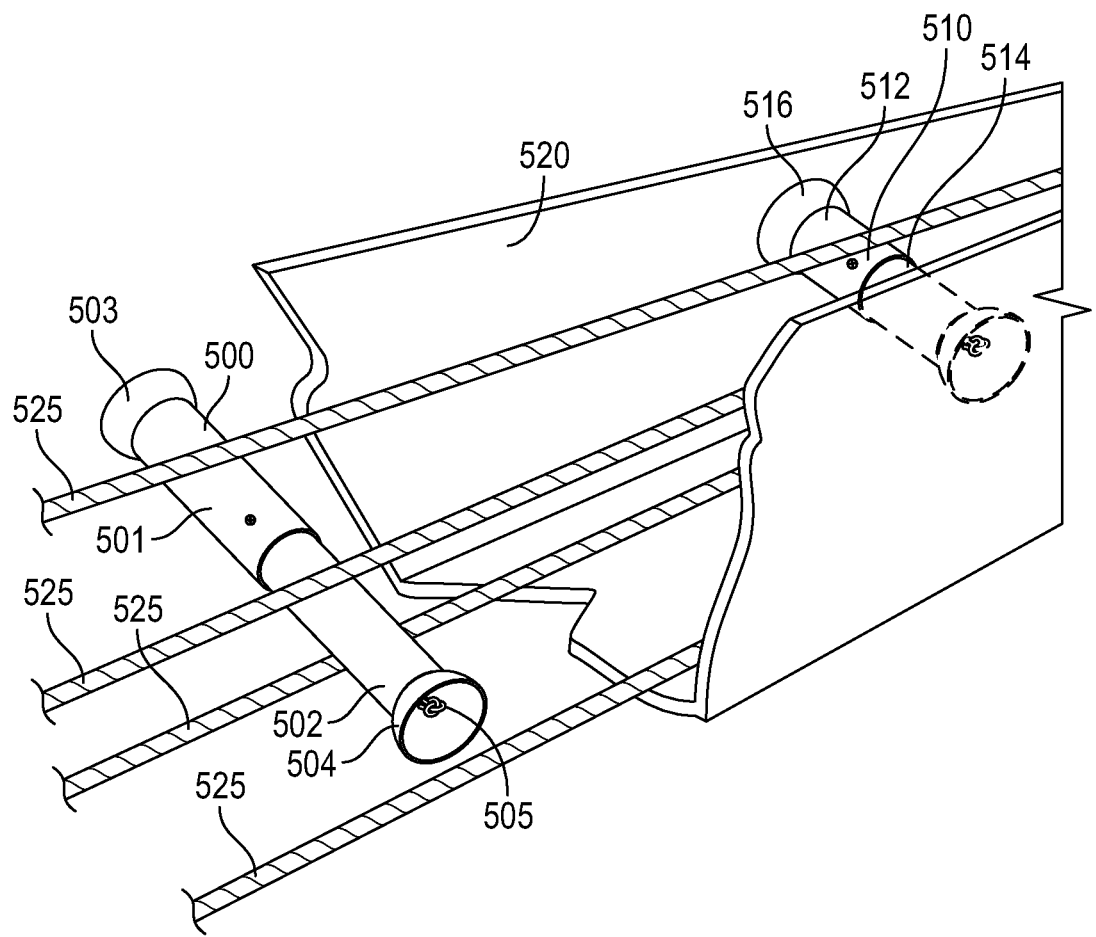
FIG. 5 shows an adjustable beam sleeve, in accordance with one exemplary embodiment of the present disclosure.

Now, referring to FIG. 5, a first adjustable beam sleeve 500 comprising a first sleeve 501 and second sleeve 502, and a second adjustable beam sleeve 510 comprising a third sleeve 512 and a fourth sleeve 514 are shown, in accordance with one exemplary embodiment of the present disclosure. In the current embodiment, the inner diameter of the first sleeve 501 is more than the outer diameter of the second sleeve 502. Further, the inner diameter of the third sleeve 512 is more than the outer diameter of the fourth sleeve 514.

As can be seen, the first sleeve 501 comprises a first bowl 503 at one end. The second sleeve 502 comprises a second bowl 504 at one end. The third sleeve 512 comprises a third bowl 516. Similarly, the fourth sleeve 514 comprises a fourth bowl (not shown). As explained above, the first adjustable beam sleeve 500 comprises an elastic string 505 drawn through the first bowl 503, inner surfaces of the first sleeve 501 and the second sleeve 502, and the second bowl 504. Similarly, the second adjustable beam sleeve 510 comprises an elastic string (not shown) drawn through the third bowl 516, inner surfaces of the third sleeve 512 and the fourth sleeve 514, and the fourth bowl.

As presented above, each of the first adjustable beam sleeve 500 and the second adjustable beam sleeve 510 may be coupled to a bracket structure or beam 520. Specifically, the first adjustable beam sleeve 500 is coupled to the bracket structure 520 by means of the first bowl 503 and the second bowl 504 and the second adjustable beam sleeve 510 is coupled to the bracket structure 520 by means of the third bowl 516 at one end and the fourth bowl at another end. Further, the first adjustable beam sleeve 500 and the second adjustable beam sleeve 510 may be supported with help of a plurality of steel bars 525 as shown on FIG. 5.

After the concrete is poured and cured, string 140 is removed (cut or the knot undone) and bowl assemblies 130; 135 are also removed.

It should be understood more than one adjustable beam sleeve may be used to provide opening on the beams to draw pipes or other objects. Further, different materials may be used to provide the first sleeve, second sleeve and the bowls as per the requirement. Further, different mechanisms may be used to connect the bowls with the first sleeve and second sleeve, respectively. In one example, a rubber band may be used to couple the bowls with the first sleeve and the second sleeve. Further, the first sleeve and the second sleeve may be provided in different sizes and length depending upon the requirement.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An adjustable sleeve, comprising:
   A) a first sleeve assembly having first and second ends;
   B) a second sleeve assembly having third and fourth ends and being telescopically mounted to said first sleeve assembly;
   C) a first bowl assembly having a first concave side and a first convex side in abutting contact relationship with said first end and further including a first through hole;
   D) a second bowl assembly having a second concave side and a second convex side in abutting contact relationship with said fourth end and further including a second through hole;
   E) an elastic string member having two ends, one of said two ends being mounted to said first bowl assembly and the other end of said string member is mounted to said second bowl assembly to urge said first and second bowl assemblies towards each other, wherein one of said two ends of said elastic string member is passed and secured to said first bowl's first concave side, wherein one of said two ends of said elastic string member is passed and secured to said second bowl's second concave side, wherein said two ends of said elastic string member each include a knot with cooperative dimensions to prevent said two ends of said elastic string member from passing through said first through hole and said second through hole; and F) a screw for selectively setting said first and second sleeve assemblies at a predetermined relative position with respect to each other.

2. The device set forth in claim 1, further including:

G) first and second grommets cooperatively mounted to said through holes to prevent said string member from coming in contact with said first and second bowl assemblies where said through holes are located.

3. The device set forth in claim 2 wherein said first and second sleeve assemblies are made out of galvanized steel.

\* \* \* \* \*